Sept. 12, 1944.  F. MILLER  2,357,903
EXPANDING DEVICE
Filed March 6, 1943
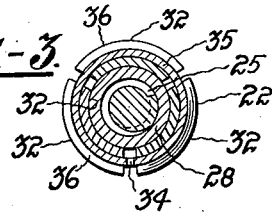
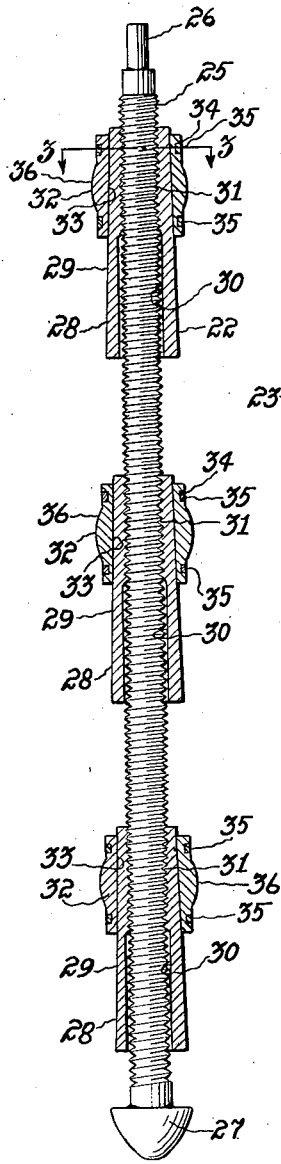
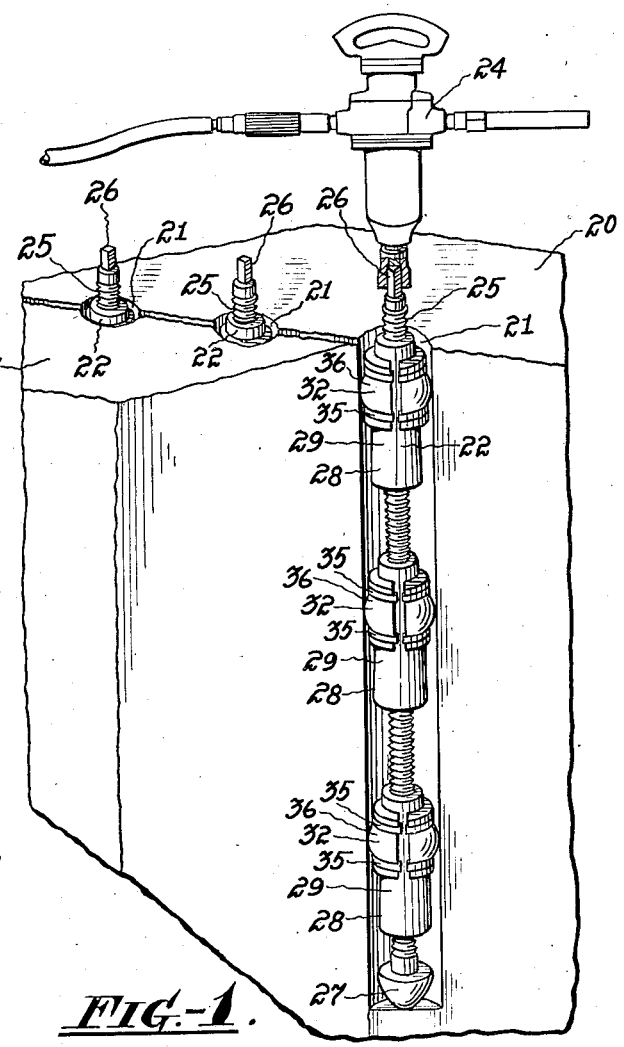
INVENTOR
Frank Miller.
BY
HIS ATTORNEY.

Patented Sept. 12, 1944

2,357,903

UNITED STATES PATENT OFFICE 2,357,903

EXPANDING DEVICE

Frank Miller, West Orange, N. J., assignor to Ingersoll-Rand Company, New York, N. Y., a corporation of New Jersey Application March 6, 1943, Serial No. 478,189

3 Claims. (Cl. 262—12)

This invention relates to expanding devices, and more particularly to an expanding device for splitting rock and the like from a bed.

One object of the invention is to expedite the operation of bringing the expanding element of the device into engagement with the surface against which the breaking force is intended to be applied.

Another object is to simultaneously apply force at a plurality of spaced points along the face of the work.

Other objects will be in part obvious and in part pointed out hereinafter.

In the drawing accompanying this specification and in which similar reference numerals refer to similar parts, Figure 1 is a perspective view, in elevation, showing several expanding devices in position for breaking a block of rock free from the mass and a power actuated tool connected to one of the devices for actuating it, Figure 2 is an elevation, partly in section, of the expanding device, and Figure 3 is a transverse view taken through Figure 2 on the line 3—3.

Referring to the drawing, and at first more particularly to Figure 1, 20 designates a bed of rock having drill holes 21 spaced with respect to each other along a proposed line of cut, and 22 are expansion devices arranged within the drill holes 21 to break a block 23 of rock from the bed 20. A power actuated tool 24, of the rotary type, is shown operatively connected to one of the devices 22 to illustrate one way of operating it.

The expansion device, constructed in accordance with the invention, comprises a screw 25 having a polygonally shaped shank 26 at one end for cooperation with the rotary tool 24, and at the opposite end of the screw is a rounded head 27 to seat upon the bottom of the drill hole 21.

The screw 25 may be of any suitable length, and spaced along its threaded portion are a plurality of wedge members 28 of sleeve-like shape having external coniform surfaces 29. The wedge members are so positioned on the screw that, in the operative position of the expansion device in a rock bed, their ends of smaller diameter point toward the bottom of the drill hole. Preferably only a portion of the bores 30 within the members through which the screw extends are provided with threads 31 for engagement with the threads of the screw.

Arranged upon each wedge member is a set of jaws 32, consisting preferably of three jaws to a set, for engagement with the wall of the drill hole 21. The jaws are freely slidable and rotatable upon the wedge members and their inner surfaces 33 are shaped to conform with the coniform surface 29 which they engage. Near the ends of the jaws are external grooves 34 to receive split rings 35 that act to press the jaws into frictional engagement with the coniform surface 29 and to maintain said jaws in the correct assembled relation with each other. The intermediate portion of each jaw juts outwardly and has a convex surface 36 for engagement with the wall of the drill hole.

In the operation of the device, the wedge members are first positioned along the length of the screw 25 to correspond with the points in the drill hole at which it is intended to apply expansive force. The jaws are next positioned near the upper ends of the wedge members to minimize their over-all diameters so that they will pass readily into the drill hole.

The expanding device is then placed into the drill hole and if, in doing so, the rounded head 27 is brought sharply into contact with the bottom of the hole the consequent jar will cause the jaws 32 to slide downwardly along the coniform surfaces 29, and expand to bring the convex surfaces into contact with the work. The screw 25 may then be rotated to draw the wedge members through the jaws for expanding them further and thereby break the block 23 from the bed.

In operations where it is intended to remove a block 23 of material without causing incipient fractures therein it may be desirable to employ a plurality of expanding devices in adjacent drill holes and actuate the said devices simultaneously or successively as by transferring the actuator 24 from one expansion device to another to apply breaking force progressively along the line of cleavage.

I claim:

1. An expanding device for cleaving rock and the like, comprising means having a coniform surface, a plurality of jaws freely slidable upon the coniform surface, convex work-engaging surfaces on the peripheries of the jaws, and a screw in threaded engagement with said means for moving the said means longitudinally of the jaws to force said jaws apart.

2. An expanding device for cleaving rock and the like, comprising a member having a coniform surface, a plurality of jaws freely slidable and rotatable upon the coniform surface, protuberances on the peripheries of the jaws having convex work-engaging surfaces, means for holding the jaws in the correct assembled position with respect to each other, and a screw extending through the member and in threaded engagement therewith for moving the member longitudinally of the jaws to force the jaws apart.

3. An expanding device for cleaving rock and the like, comprising a plurality of wedge-members each having a coniform surface, sets of jaws on the coniform surfaces, convex surfaces on the jaws to engage the material intended to be broken, a screw extending through the wedge-members for holding the wedge-members in spaced relation with respect to each other and for actuating the wedge-members longitudinally of the jaws to force the jaws of each set apart, and spring rings for holding the jaws in engagement with the coniform surfaces and being interlockingly connected with the jaws for holding the jaws of a set in the correct assembled position with respect to each other.

FRANK MILLER.